United States Patent
Piana et al.

(10) Patent No.: US 7,848,841 B2
(45) Date of Patent: Dec. 7, 2010

(54) CUSTOMER-CREATED TEXTILES AND METHOD OF PRODUCING SAME

(75) Inventors: Andrea Piana, Atlanta, GA (US);
Sang-Hoon Lim, Kennesaw, GA (US);
Andy Hollis, Evans, GA (US)

(73) Assignee: Tintoria Piana US, Inc., Cartersville, GA (US)

( * ) Notice: Subject to any disclaimer, the term of this patent is extended or adjusted under 35 U.S.C. 154(b) by 708 days.

(21) Appl. No.: 11/689,213

(22) Filed: Mar. 21, 2007

(65) Prior Publication Data

US 2008/0234867 A1    Sep. 25, 2008

(51) Int. Cl.
*G06F 19/00* (2006.01)
(52) U.S. Cl. .................. 700/133; 8/478; 8/494; 8/116.1; 700/130; 700/131; 700/132; 705/16
(58) Field of Classification Search ............... 700/4, 700/132, 130, 131, 133; 8/445–446, 115.51, 8/116.1, 478, 494; 705/16
See application file for complete search history.

(56) References Cited

U.S. PATENT DOCUMENTS

| | | | | |
|---|---|---|---|---|
| 2,255,028 | A | * | 9/1941 | Long .................. 68/12.19 |
| 4,756,037 | A | * | 7/1988 | McFadyen et al. .......... 8/150 |
| 2002/0066145 | A1 | * | 6/2002 | Gupta et al. .................... 8/478 |
| 2003/0105753 | A1 | * | 6/2003 | Lee et al. ....................... 707/4 |
| 2003/0139840 | A1 | * | 7/2003 | Magee et al. ............... 700/133 |
| 2006/0015207 | A1 | * | 1/2006 | Weiser et al. .............. 700/132 |
| 2007/0226919 | A1 | * | 10/2007 | Mheidle ...................... 8/446 |

FOREIGN PATENT DOCUMENTS

WO    WO2005103369    * 11/2005

* cited by examiner

*Primary Examiner*—Lorna M Douyon
*Assistant Examiner*—Tri V Nguyen
(74) *Attorney, Agent, or Firm*—Whitham Curtis Christofferson & Cook, PC

(57) ABSTRACT

Customers obtain customized textile materials by selecting style, shape, size, pattern and color for an undyed textile product. Based on a selection made by the customer, the textile product is transformed by a dyeing operation performed on a single item to yield a product, such as a shirt, pants, or jacket, which has a color and pattern of his or her own choosing, in the size and style he or she desires. The process can be performed in a retail setting using a dye machine which allows the process to be viewed by the customer. Preferably, the textile material is constructed from yarns which include cationic cotton alone or in combination with natural cotton or other natural or synthetic fibers, and using anionic dyes, such as a fiber reactive dye, such that the dye is exhausted during the process and effluent from the dye machine is environmentally friendly without excess dye, salts, and alkalis.

3 Claims, 1 Drawing Sheet

CUSTOMER-CREATED TEXTILES AND METHOD OF PRODUCING SAME

BACKGROUND OF THE INVENTION

1. Field of the Invention

The present invention generally relates to a new business method for providing customers with customized textiles, such as apparel including shirts, pants, coats, etc., upholstery for furniture or use in vehicles, bed linens, etc., where the customer can obtain a fabric material that will have a size, style, pattern and color of his or her own choosing, and where the fabric material will be produced for that customer on a one-at-a-time basis.

2. Background Description

Consumer choice for textile products is currently limited by the number of colors and patterns offered by a store or manufacturer. In the case of clothing, when a customer visits a store and tries on shirt, pants, suit, or other garments of interest, he or she may identify a style (i.e., cut, etc.) that he or she prefers, but may not be able to obtain the garment in a color he or she wants or in a pattern (e.g., faded, striped, etc.) he or she wants. The same is true when ordering garments from a catalog. In the paper or online catalog setting, the customer is presented with various clothing options, and each item may be selected only with a limited number of color and pattern choices. The manner in which other textile products (e.g., bed linens, upholstery, curtains, etc.) are currently marketed have similar shortcomings. What is needed is a way for customers to get exactly the color and pattern they desire, for a garment or other fabric material of interest, and to be able to provide the customer with the garment or other fabric material on a fairly rapid basis.

SUMMARY OF THE INVENTION

According to the invention, a business method is provided which allows customers to obtain fabric materials, such as garments, bed linens, upholstery, etc. in a size, style (shape), pattern, and color specified by the customer. The customer selects the size and style he or she desires from undyed fabric materials. The undyed fabric materials can be obtained by weaving or knitting so as to provide patterns of interest by, for example, varying ratios of cationic cotton and natural cotton in the yarn. The fabric material is then dyed, one at a time using a dye which produces the color selected by the customer, under environmentally friendly conditions (no salts or alkalis or only very low levels of salts or alkalis; low temperatures), such that either no amount or very reduced levels of dye or harmful effluent are discharged. The dye preferentially adheres to cationic cotton, as opposed to natural cotton, such that, for example fabrics or garments that are made from yarns which have varying ratios of cationic cotton to natural cotton will have stripes, shade gradations, and other patterns of interest to customers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
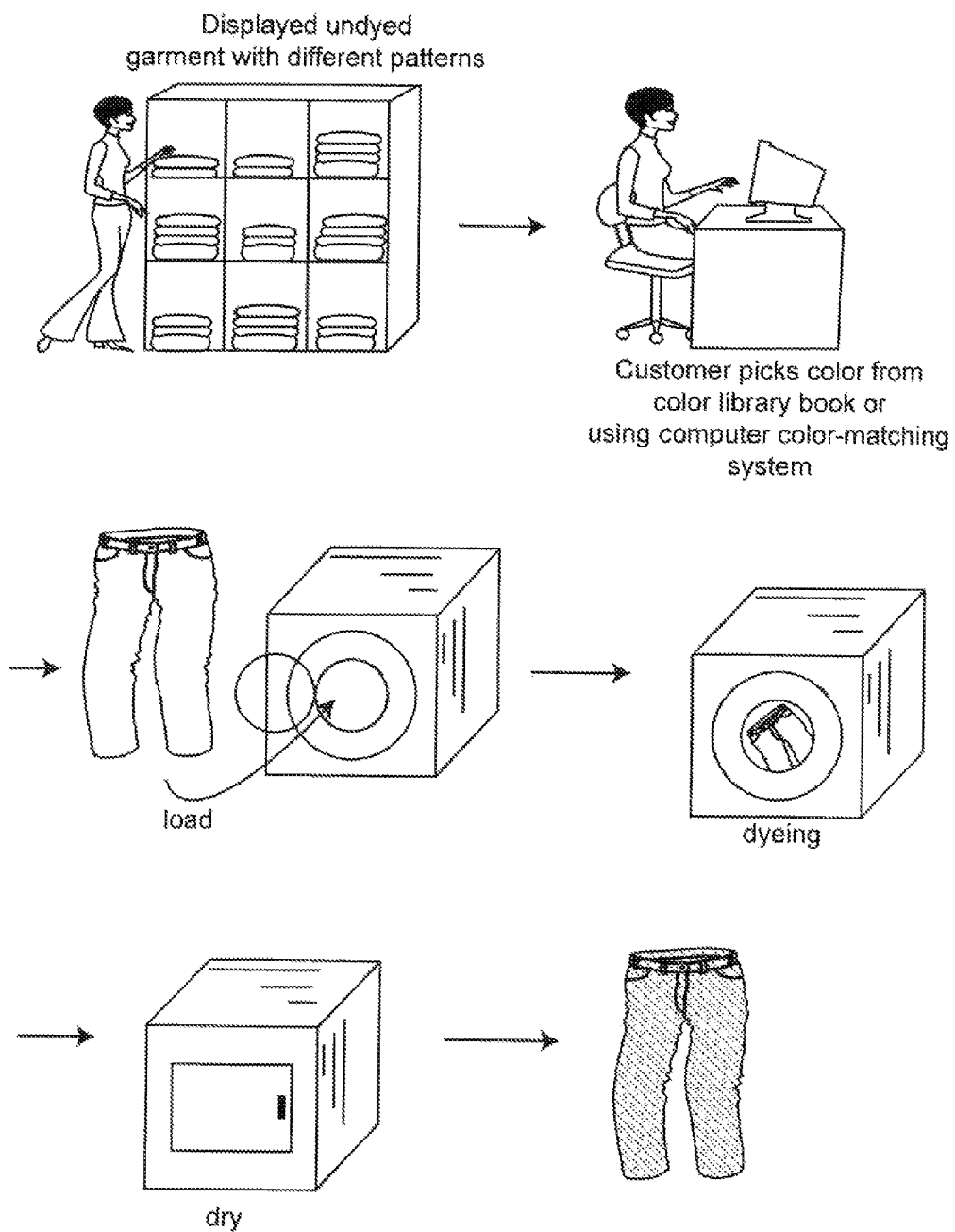
FIG. 1 shows schematic of system components in a retail outlet, as well as process steps, where garments can be purchased and selectively dyed on the premises so as to achieve colors and patterns customized for individual customers.

The present invention relates to a system and method for producing customer-created textile goods, such as garments, upholstery, linens, curtains, and towels, etc. By customer-created, we mean that the customer is able to choose a color and pattern of his or her own liking for a textile good of interest, and to have that textile good dyed for him or her as a single item such that he or she will be able to have a highly personalized textile product of his or her own choosing.

Garments available in a store are generally available in a limited number of colors and patterns. Some customers have different preference on color other than the colors displayed at a store. Those who desire individual color and pattern will hire a designer, but this process will be expensive and slow. In the present invention, by contrast, customers can choose color and pattern of the textile goods. The textiles goods are preferably dyed at a store while customers are waiting or shopping. However, within the practice of the invention, one could also order textile goods of interest online using the Internet or other network or communications platform, and select a textile good of interest to be colored and patterned according to the customers selected specifications.

FIG. 1 shows an exemplary embodiment of the invention wherein a customer selects an undyed garment of interest. The garment will have certain "style". The variations in style are limitless. For example, it will be recognize that a crew neck shirt, polo style shirt, button down shirt, V-neck shirt, and mock turtle neck shirt are all different "styles" of shirts, and it will be further recognized that different designers, e.g., Versace®, Ralph Lauren®, Calvin Klein®, Sean John®, Channel®, DK®, etc., all have different variations of these types of shirts and these would also be considered "style" within the practice of the invention.

The undyed garment of interest, depending on the materials used in its construction, may shrink during dyeing processes; thus, the retail outlet may include pre-shrunk garments for the customer to choose from and try on, and after he or she determines the appropriate size for themselves, the garment which will be selected will be of a size that will produce the size and pattern selected by the customer. In an online ordering situation, the customer would merely select the size that is appropriate for him or her, and the company which produces the selected garment will choose the appropriate sized undyed garment to produce the product of interest.

A variety of materials can be used to manufacture the undyed textile garments or other articles that are to be selected by the customer and used in the practice of this invention. For example, cotton, cationic cotton, wool, silk, rayon, etc. may be used, and materials made from synthetics including polymer blends, polyester, nylon, acrylics, spandex, etc. In the practice of the invention, the textile goods are manufactured using cationic cotton where the cationic cotton is used alone or together with other fibers (e.g., those set forth above as well as other fibers). For example, amount of cationic cotton used in the textile products can range from 1-100% by weight. To achieve different effects, the cationic cotton might constitute 20%-80%, 40%-60%, approximately 50% by weight, and the amount of cationic cotton can vary in different physical regions of the textile product. Cationic cotton develops a proper color under the dyeing conditions which would be used in the practice of this invention such as when using anionic dyes, with either no salt or no alkalis or with low levels of such agents, at low temperatures (below 200 F), etc. To make a cationic cotton, cotton fiber is treated with a cationic compound to introduce cationic group permanently.

Cotton is typically dyed using either direct dyes or fiber-reactive dyes. Both type of dyes are anionic (negative). Cotton develops a negative charge in water, which is a medium of dyeing. Since the dyes are negatively charged, the dye and cotton fiber repel each other. To overcome this electrical repulsion and for cotton to be dyed, a large amount of salts (up to equal amount to the weight of the fabric), such as sodium chloride or sodium sulfate, are added in traditional dying procedures. The high concentrations of salts in aqueous effluents can cause environmental problems. In addition to the use of salt, fiber-reactive dyes need alkali during dyeing, such as sodium carbonate or sodium hydroxide, to form strong covalent bonds between fiber and dye. These strong bonds provide good "washfastness" for the color. However, during dyeing, a significant amount of fiber-reactive dyes (10~40%) undergo hydrolysis and cannot be bonded to the fiber. To remove the un-reacted dyes, substantial washing time is required. In addition to the large amount use of water and energy, the dyes in the effluent cause environmental pollution. With direct dyes the washfastness is poor, and proper after treatment is required to get a better washfastness.

As an attempt to resolve some of the issues noted above for traditional cotton dyeing, it is known to chemically modify cotton by introducing cationic (positive) charge on cotton (to create "cationic cotton"). One of the cationic reagents extensively studied for this purpose is 3-chloro-2-hydroxy propyltrimethylammonium chloride. A variety of procedures are know for creating cationic cotton including those described in U.S. Pat. Nos. 3,685,953, 4,072,464, and in Michael Rupin, Dyeing with Direct and Fiber Reactive Dyes, Textile Chemists and Colorist, Vol. 8, No. 9, p 54 (1976)), the complete contents of each of which is herein incorporated by reference, and the procedures described therein can be practiced within the scope of the present invention. In addition, cationic cotton can be purchased commercially from Tintoria Piana US, Inc. (Cartersville, Ga.).

The cationic cotton has a strong attraction to anionic dyes, such as direct dyes, fiber-reactive dyes, and acid dyes. Examples of direct dyes include Solphenyl®, Everdirect®, etc. Examples of fiber-reactive dyes include Cibacron®, Sumifix®, Evercion®, etc. Examples of acid dyes include Everlan®, Leadacid®, etc. The strong attraction between cationic cotton and the anionic dyes leads to outstanding washfastness. The cationic cotton can be dyed with anionic dyes without the addition of salt or alkali. The fabrics and garments made with cationic cotton can be dyed much quicker and dyed at a lower temperature than traditional cotton dyeing (e.g., at temperatures lower than 200 F). In addition, the dyeing using cationic cotton is environmentally friendly because there are much smaller amounts of unfixed dyes resulting from the process, and no salt or alkali in the wastewater (see, e.g., Lance Frazer, Innovations—A Cleaner Way to Color Cotton, Environmental Health Perspectives, Vol. 110, No. 5 (May 2002); and Peter Hauser, Reducing Pollution and Energy Requirements in Cotton Dyeing, Textile Chemists and Colorist & American Dyestuff Reporter, Vol. 32, No. 6 (June 2000)), both of which are incorporated herein by reference.

Since natural cotton needs salts and (or) alkali to be dyed, when cationic cotton fiber is blended with natural cotton fiber to make a yarn, the yarn can produce heather (melange) effect under a dyeing condition without salt and (or) alkali. Using yarns comprising varying amounts of cationic cotton (e.g., ratios of cationic cotton to natural cotton ranging from 1/99 to 99/1 percent by weight), a fabric with stripes of different shade gradations can be produced. Using yarns made with cationic cotton and natural cotton for weaving and knitting, a number of exciting colored patterns can be created. Since natural cotton cannot be dyed without the addition of salt or salt/alkali, but cationic cotton can be easily dyed without addition of salt and alkali, the garments are preferably dyed without adding salt and alkali in the practice of the invention such that the garments develop a special look, such as a heather look, stripes, or a blue jean look, depending on the combined use of natural and cationic cotton. In a retail store embodiment, the garment is displayed as undyed, but each garment has a pattern that will be developed after dyeing which depends on the weave, the knitting pattern, or the ratio of cationic cotton to natural cotton in the yarn (which itself can vary in a pattern throughout the textile article being produced).

As shown in FIG. 1, in operation, a customer chooses any color from a color library and chooses a garment with a specific pattern. A customer can bring a color that he(she) prefers to the retail outlet where the color can be matched using a commercial color-matching system. The garment is loaded in an in-store garment dyeing machine. Water is added to give, for example, a water to goods ratio of 5:1 to 20:1. Predissolved anionic dye is slowly added to the machine. Basically, any kind of anionic dye can be used for this process, but preferably fiber-reactive dyes are used. The dyeing machine is heated to a target temperature (100 F~200 F) and run for 5~30 minutes. While dyeing the garment, a customer can watch the garment dyed through a window of the machine and may be able to see transport of dye and fluids through transparent hoses or other connections on the machine. At the end of dyeing cycle, a customer can see a clear dyeing bath since all dyes were exhausted into the garment, which provides the customer with the assurance that the process is environmentally friendly. The machine is cooled and drained. The garment is rinsed with warm water and extracted. The dyed garment is dried in a commercial drier. Customers can get a garment at their color and pattern preference while they are waiting at the store. Also, the dyeing with cationic cotton is environmentally friendly because dye is almost completely exhausted. The invention can be practiced with garments, as well as other textile products such as upholstery, linens, towels, etc. The invention may also be practiced in an online ordering situation. The invention provides the advantage that the customer gets a unique, custom-made garment having a particular pattern and color he or she desires. In some application, the customer can cause the pattern to be modified by choosing a garment size and style, and, in addition to choosing a color, he or she can choose the ratio of cationic cotton to cotton used throughout the garment or textile article, or at various locations within the garment or textile article itself (e.g., the arms of a shirt may be 100% cationic cotton to yield a solid color, while the chest and back region can be 50% cationic cotton 50% natural cotton to give a blue jean like finish—one where only some of the yarn is colored and some is not). After creation of a customer textile product of a desired color and pattern, the customer may also have the option of having a monogram or other symbol embroidered or imprinted on the product.

The following examples illustrate a number of applications of the invention; however, it will be clear that the invention can be practiced in a number of different ways not specifically set forth below.

EXAMPLE I

A customer chooses an undyed knit shirt having stripes made from cotton yarns containing different levels of cationic cotton. The customer chooses a red color. The shirt is loaded in a garment dyeing machine. Predissolved red fiber-reactive dye (1% on weight of garment) is added to the machine at the liquor to goods ratio of 15:1. The dyeing bath is heated to 180 F and run for 10 min. The bath was cooled, drained, rinsed with warm water, and extracted. The dyed garment was dried using a commercial drier. The final dyed shirt is obtained with red stripes with shade gradations.

EXAMPLE II

A customer chooses undyed pants woven with cationic cotton yarn as warp and natural cotton yarn as filling. The customer chooses a blue color. The pants are loaded in a garment dyeing machine. Predissolved blue fiber-reactive dye (2% on weight of garment) is added to the machine at the liquor to goods ratio of 15:1. The dyeing bath was heated to 180 F and run for 15 min. The bath was cooled, drained, rinsed with warm water, and extracted. The dyed garment was dried using a commercial drier. The final dyed pants are obtained with blue jean look.

EXAMPLE III

A customer chooses an undyed knit shirt made with cotton yarn containing 100% cationic cotton. The customer chooses a blue color. The shirt is loaded in a garment dyeing machine. Predissolved blue fiber-reactive dye (1% on weight of garment) is added to the machine at the liquor to goods ratio of 15:1. The dyeing bath was heated to 180 F and run for 10 min. The bath was cooled, drained, rinsed with warm water, and extracted. The dyed garment was dried using a commercial drier. The final dyed shirt is obtained with solid blue color.

EXAMPLE IV

A customer chooses an undyed knit shirt made with cotton yarn made by blending 50% cationic cotton and 50% natural cotton. The customer chooses green color. The shirt is loaded in a garment dyeing machine. Predissolved green fiber-reactive dye (1% on weight of garment) is added to the machine at the liquor to goods ratio of 15:1. The dyeing bath was heated to 180 F and run for 10 min. The bath was cooled, drained, rinsed with warm water, and extracted. The dyed garment was dried using a commercial drier. The final dyed shirt is obtained with blue heather look.

EXAMPLE V

A customer chooses an undyed woven curtain fabric having stripes made from cotton yarns containing different levels of cationic cotton. The customer chooses a blue color. The fabric is loaded in a garment dyeing machine. Predissolved blue fiber-reactive dye (1% on weight of garment) is added to the machine at the liquor to goods ratio of 15:1. The dyeing bath is heated to 180 F and run for 10 min. The bath was cooled, drained, rinsed with warm water, and extracted. The dyed fabric was dried using a commercial drier. The final curtain fabric is obtained with blue stripes with shade gradations.

While the invention has been described in terms of its preferred embodiments, those skilled in the art will recognize that the invention can be practiced with considerable modification within the spirit and scope of the appended claims.

Having thus described our invention, what we claim as new and desire to secure by Letters Patent is as follows:

1. A business method of producing customized dyed fabric materials in a retail environment, comprising the steps of:
    a) providing a selection of fabric materials manufactured with at least some yarns containing cationic cotton, said fabric materials being woven or knitted so as to provide patterns of interest by varying amounts of cationic cotton in the yarns;
    b) providing a customer with said selection for selecting a fabric material, and for the selected fabric material, selecting a size, pattern, and color;
    c) placing the selected fabric material which will produce, the selected pattern in a dyeing machine,
    said fabric material placed in said dyeing machine having a pattern which is a function of at least one of weave Or knit pattern, and varying content of cationic cotton in said fabric material;
    d) dyeing said fabric material with an anionic dye solution which produces the pattern and color selected in said selecting step;
    e) allowing a customer to view said material in said dye machine during said dyeing step;
    f) repeating steps b) to e) for additional selected fabric materials; and
    g) delivering to said customer the selected and dyed fabric material of said customer's color and pattern preferences while said customer is waiting at the retail environment.

2. The business method of claim 1 wherein said fabric material is clothing containing cationic cotton.

3. The business method of claim 1 wherein said fabric material is selected from upholstery, linens, curtains and towels containing cationic cotton.

* * * * *